(12) United States Patent
Op't Roodt

(10) Patent No.: US 7,493,672 B2
(45) Date of Patent: Feb. 24, 2009

(54) ADAPTER HINGEDLY CONNECTING A WIPER BLADE TO A WIPER ARM

(75) Inventor: Inigo Op't Roodt, Hasselt (BE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 11/547,891

(22) PCT Filed: Feb. 11, 2005

(86) PCT No.: PCT/EP2005/050607

§ 371 (c)(1),
(2), (4) Date: Oct. 6, 2006

(87) PCT Pub. No.: WO2005/097570

PCT Pub. Date: Oct. 20, 2005

(65) Prior Publication Data

US 2007/0199174 A1 Aug. 30, 2007

(30) Foreign Application Priority Data

Apr. 10, 2004 (DE) .................. 10 2004 017 722

(51) Int. Cl.
*B60S 1/40* (2006.01)
*B60S 1/38* (2006.01)
(52) U.S. Cl. ............. 15/250.32; 15/250.44; 403/371; 403/326; 16/2.1; 24/453
(58) Field of Classification Search ............. 15/250.32, 15/250.351, 250.44, 250.46; 403/161–163, 403/316, 243, 351, 365, 315, 152, 371, 372, 403/326, 374.1; 24/297, 607, 453; 16/2.1
See application file for complete search history.

(56) References Cited

U.S. PATENT DOCUMENTS

| 4,158,513 | A | * | 6/1979 | Journee ................ 403/316 |
| 4,446,589 | A | * | 5/1984 | Maiocco ............... 15/250.32 |
| 6,789,289 | B2 | | 9/2004 | Roodt |

FOREIGN PATENT DOCUMENTS

| DE | 26 04 325 | 8/1977 |
| DE | 101 62 397 | 7/2003 |
| DE | 101 62 402 | 7/2003 |
| GB | 2362812 | 12/2001 |
| JP | 4877838 | 9/1973 |
| WO | WO 03/051688 | 6/2003 |

* cited by examiner

*Primary Examiner*—Gary K Graham
(74) *Attorney, Agent, or Firm*—Michael Best & Friedrich LLP

(57) ABSTRACT

An adapter (38, 66) for the articulated connection of a wiper blade (24) to a wiper arm (10) using the sidelock system, wherein the adapter (38, 66) has an essentially cylindrical longitudinally slotted bearing element (40, 68), which can be inserted into passages (34) in side walls (30) of a suspension box (28) of the wiper blade (24) and can be fixed on a first end on the edge of a passage (34) by means of locking hooks (50), while its second end is connected with a bearing surface (54, 78), which is adjacent to the outer side of the opposing side wall (30) and is secured against twisting by at least one clip (58, 80). The clip (58, 80) has a locking nose (60), which points in the direction of the bearing element and locks on an edge of the coordinating side wall (30) of the suspension box (28) during assembly.

3 Claims, 2 Drawing Sheets

ADAPTER HINGEDLY CONNECTING A WIPER BLADE TO A WIPER ARM

BACKGROUND OF THE INVENTION

The invention starts with an adapter for the articulated connection of a wiper blade to a wiper arm.

Known windshield wipers feature a wiper arm, which sits on a wiper shaft. A wiper motor drives this shaft. A wiper blade is connected in an articulated manner with the free end of the wiper arm. The wiper blade as a rule has a multi-element supporting bracket system with a main bracket. Subordinate brackets are coupled to this system and at least several of these with claws on their ends hold a wiper strip. Non-articulated wiper blades are also known, which, instead of the supporting bracket system, have a resilient elastic supporting element perpendicular to the vehicle window, which is manufactured of plastic. In order to improve the springy property, it can feature at least one spring rail made of spring steel. The supporting element has a greater curvature than the vehicle window in an unstressed state so that the wiper strip is applied to the vehicle window under the application force of the wiper arm with an appropriate distribution of pressure.

A windshield wiper with a wiper blade with a main bracket that is coupled to a wiper arm via a so-called sidelock system is known from DE 101 62 402 A1. For this purpose, a pin is riveted laterally on the free end of the wiper arm, which features a U-shaped profile that is open towards the vehicle window. The pin points transverse to the longitudinal direction of the wiper arm and towards the wiper blade. During assembly of the wiper blade, it is pushed into a passage bore hole of an adapter, which is previously inserted into two opposing passages in the side walls of a suspension box of the wiper blade. For this purpose, the adapter has an essentially cylindrical bearing element, which features at least one longitudinal slot and guide surfaces on its ends, with which it is pivoted in the passages of the suspension box. The slot makes it possible for the bearing element to yield elastically radially and to expand again after going through the passages. As a result, the bearing element can be fixed axially in the suspension box between the locking hooks on a first end and a bearing surface on its second end. If the pin is pushed into the passage bore hole, the bearing element is no longer able to yield radially so that the adapter can no longer detach from the suspension box. In order to avoid a relative rotation between the pin and the adapter, the adapter has a clip with a locking nose on its second end and this locking nose locks on a leg of the U-shaped profile of the wiper arm during assembly. This is hampered by the fact that the locking nose must be aligned on the leg of the U-shaped profile. Furthermore, the relative movement takes place between the relatively narrow guide surfaces and the low wall thicknesses of the passages, the consequence of which is a high surface stress of the articulated surfaces.

A bridge, which is bent on its free side towards the side of the pin, is arranged parallel to the pin on the wiper arm offset in the longitudinal direction. In an assembly position, in which the wiper blade is held transverse to the longitudinal direction of the wiper arm, the pin can be pushed into the passage bore hold of the adapter. If the wiper blade is then rotated in the longitudinal direction of the wiper arm, the bridge grips over the wiper blade and locks it with its bent end so that in an assembled state the wiper blade is guided onto the pin between the bent end of the bridge and the wiper arm.

Furthermore, a similar windshield wiper with a wiper blade with a main bracket, which is coupled to a wiper arm via a so-called sidelock system, is known from DE 101 62 397 A1.

The cylindrical adapter is pressed into the passages until it is adjacent with a collar on one end on the outer side of the suspension box. Since the adapter sits firmly in the wiper blade, the relative movement takes place between the adapter on the one hand and the wiper arm or its pin on the other. Moreover, the parts of the wiper arm and the wiper blade, which are manufactured of sheet metal as a rule, are isolated from one another by the adapter made of plastic thereby minimizing movement noises and wear.

In order to guarantee that the bent end of the bridge can slide in an assembled state with little play on the coordinating outer side of the suspension box, a plate made of plastic is fastened on this side. This plate features recesses on the side facing the suspension box for the edges of the passages and for the projection of the articulated bolt. In addition, a recess is provided in the area of the pin so that the pin and, if necessary, the adapter can project a short distance over the coordinating passage or its edge. The plate equalizes the unevenness on the outer side of the suspension box so that the bent end of the bridge encounters a smooth bearing surface. The plate can be screwed, riveted, glued, or clipped onto the suspension box. If screws or rivets are used, they should advantageously have a countersunk head. The number of components increases because of the plate.

SUMMARY OF THE INVENTION

According to the invention, the clip has a locking nose that points in the direction of the bearing element and locks on an edge of the coordinating side wall of the suspension box during assembly. As a result, the adapter is connected with the suspension box in a torque-proof manner so that no relative movement is generated between the passages and circumference of the bearing part. The rotational movement required for the articulation takes place exclusively between the bearing bore hole of the adapter and the pin of the wiper arm. In this case, the bearing surfaces can be dimensioned large enough so that no appreciable wear occurs. Nevertheless, should the adapter have to be replaced, this is easily possible by detaching the clip and pulling the adapter out of the passages. Moreover, the adapter no longer needs to be aligned with the wiper arm during assembly of the wiper blade on the wiper arm.

In one embodiment of the invention, the second end of the bearing element is formed on a cap, which in an assembled state is adjacent with a bearing surface to the coordinating side wall of the suspension box and has at least one clip. The cap can fulfill several functions. To begin with, it keeps the bearing element from twisting in the passages and also covers the passages and the articulated bolt on the external side walls so that they are protected from moisture and dirt. In addition, on its outer side the cap can have a bearing surface for a bent end of a bridge of a wiper arm. This facilitates assembly of the wiper blade and makes narrower tolerances possible in the axial direction of the pin so that the wiper blade is better guided on the pin of the wiper arm.

BRIEF DESCRIPTION OF THE DRAWINGS

Additional advantages are yielded from the following description of the drawing. Exemplary embodiments of the invention are depicted in the drawing. The drawing, the description, and the claims contain numerous features in combination. The person skilled in the art will also observe individual features expediently and combine them into additional, meaningful combinations.

The drawing shows.

DETAILED DESCRIPTION

Figure 1:
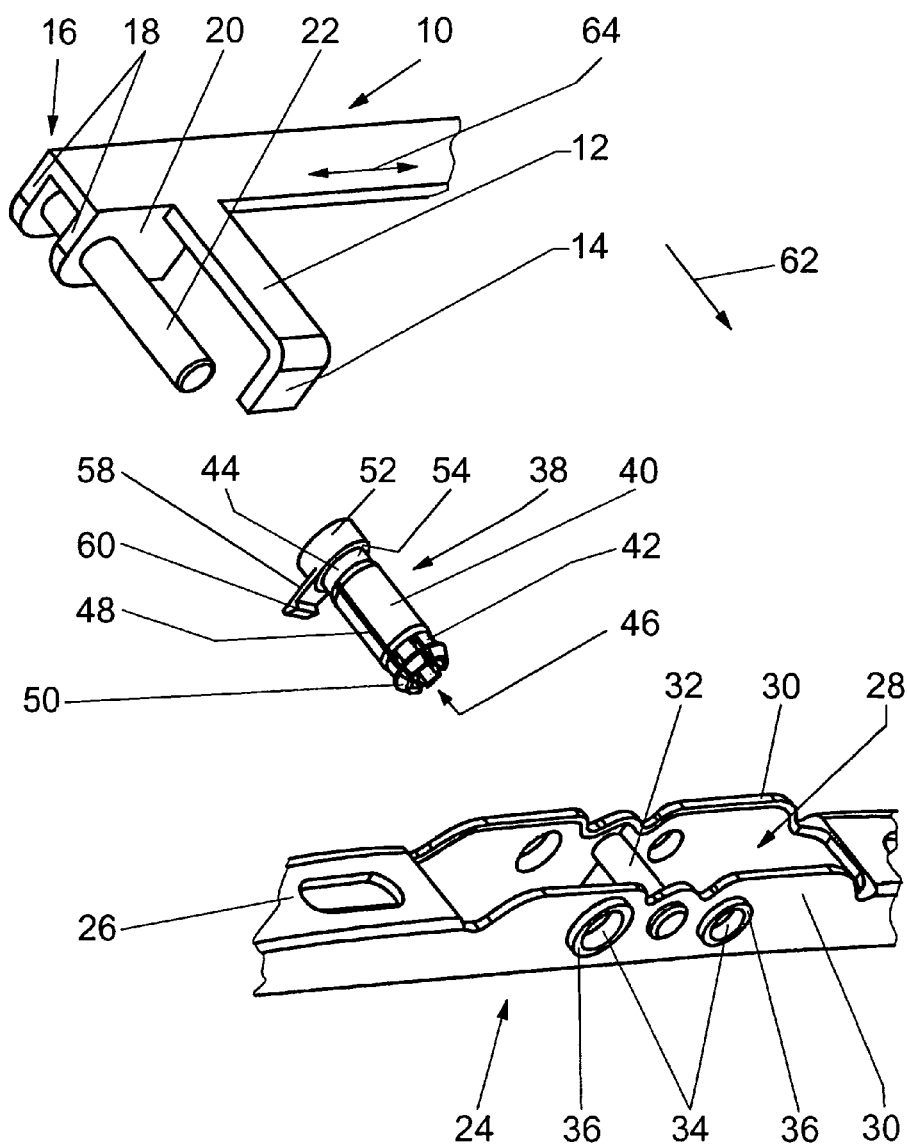
FIG. 1 An exploded representation of an articulated connection between a wiper arm and a wiper blade.

Of a windshield wiper, only the parts of a wiper arm 10 and a wiper blade 24 (FIG. 1) that are necessary for understanding the invention are depicted. The wiper arm 10 has a U-shaped profile 16, on whose legs 18 a pin 22 is laterally fastened transverse to the longitudinal direction 64 and pointing toward the wiper blade 24 so that the wiper blade 24 can be mounted using the sidelock system. Furthermore, a bridge 12 is formed on the free end of the wiper arm 10. This bridge is arranged parallel to the pin 22 offset in the longitudinal direction 64 relative to this pin and has a bent end 14. The wiper blade 24 has a supporting bracket system, a main bracket 26 of which is shown. This bracket has a suspension box 28 whose side walls 30 are connected to one another via an articulated bolt 32. In addition, on both sides of the articulated bolt 32 in the longitudinal direction 64, two opposing passages 34 each are offset in the side walls 30.

The wiper blade 24 is connected in an articulated manner to the wiper arm 10 with the aid of an adapter 38. The adapter 38 is essentially a cylindrical component (FIG. 2) with a bearing element 40, which has guides surfaces 42, 44 adjacent to both its ends. The guide surface 44 pointing towards the wiper arm 10 is delimited by a collar 52 with a bearing surface 54 that acts axially. A clip 58 with a locking nose 60 pointing towards the wiper blade 24 is formed on the circumference of the collar 52. The guide surface 42 on the other end of the adapter 38 is delimited toward the outside by locking hooks 50, which form the end of spring tongues. They are produced by longitudinal sections 48, which are distributed over the circumference, in the area of the guides surface 42 and the locking hooks 50. One or more longitudinal slots 48 reach out over the bearing element 40 so that the outside diameter of the bearing element 40 can also be reduced temporarily for assembly to the inside diameter of the passages 34. The longitudinal slots 48 reach in the radial direction from the external circumferential surface up to a passage bore hole 46, which extends through the adapter 38 in the axial direction.

During assembly of the wiper blade 24, the adapter 38 is pressed into a pair of passages 34 in the assembly direction 62, whereby the external circumference of the locking hooks 50 adapts to the inside diameter of the passages 34. The same applies to the bearing element 40 with respect to the first passage 34 in the assembly direction 62. The locking hooks 50 re-expand as soon as they have passed through the second passage 34 in the assembly direction 62. The bearing element 40 also expands in this position. The wiper blade 24 is axially fixed on the adapter 38 between the bearing surface 54 of the collar 52 and the locking hooks 50, which are each adjacent on outward pointing edges 36 of the passages 34. In order to secure the adapter 38 in the passages 34 against twisting, the locking nose 60 of the clip 58 locks on an edge of the coordinating side wall 30 of the suspension box 28.

The wiper blade 24 with a mounted adapter 38 is rotated around a longitudinal axis of the adapter 38 by 90° to the longitudinal direction 64 of the wiper arm 10 in order to be able to push the pin 22 of the wiper arm 10 into the passage bore hole 46 of the adapter 38. If the wiper blade 24 is now rotated back on the pin 22 into its initial position parallel to the longitudinal direction 64 of the wiper arm 10, the bridge 12 grips over the suspension box 28 of the wiper arm 10 and secures the wiper blade 24 on the pin 22 in the axial direction between its bent end 14 and a bearing surface 20 on the inner leg 18 of the U-shaped profile 16. Since the relative movement of the articulation only takes place between the pin 22 and the adapter 38, large bearing surfaces subject to low stress that have a long service life are yielded. In addition, the adapter 38 is simple to assemble and can be replaced easily in the case of wear.

Figure 2:
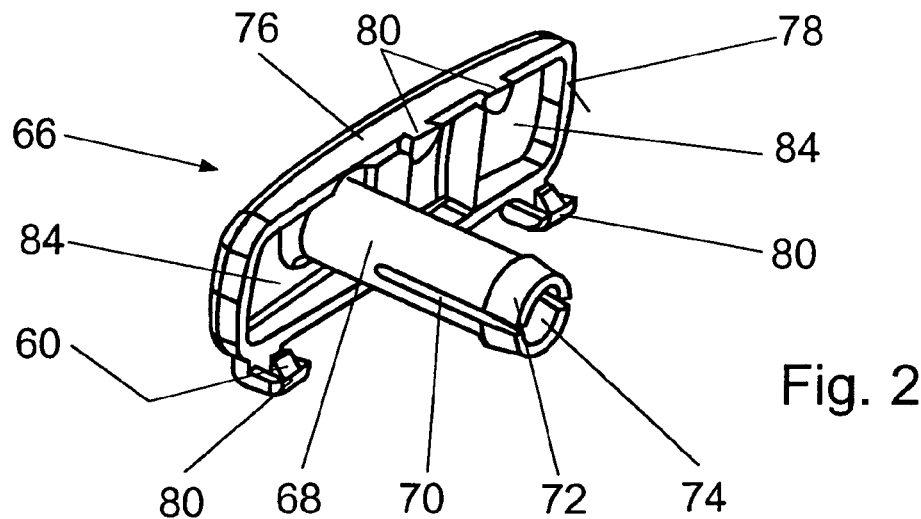
FIG. 2 A perspective view of a variation of an adapter according to FIG. 1.
Figure 3:
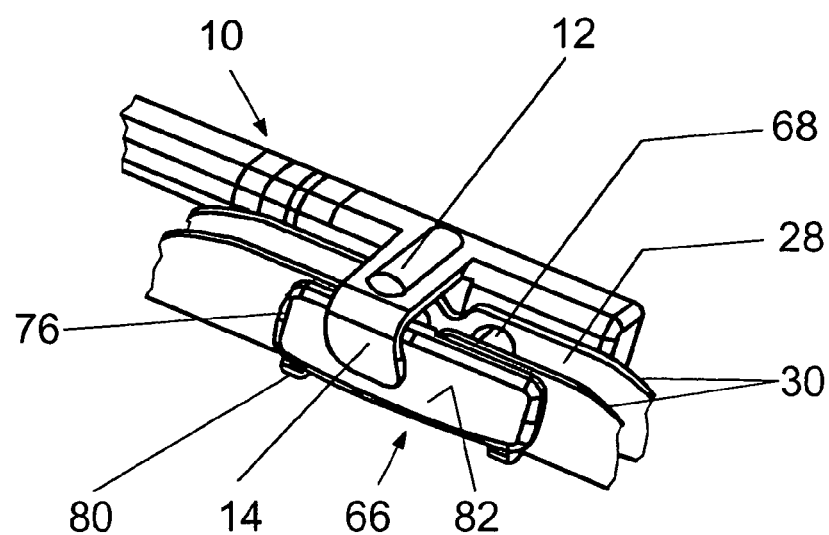
FIG. 3 A perspective representation of an articulated connection with an adapter according to FIG. 2 in an assembled state.

With one design of an adapter 66, according to FIG. 2, a locking hook 72 is provided on an essentially cylindrical bearing element 68 on the first end, while a cap 76 is formed on the second end. The cap 76 extends in the longitudinal direction of the wiper blade 24 over the area of the passages 34 and the articulated bolt 32 and covers the passages 34 as well as their outwardly projecting edges 36 toward the outside. The edges 36, as well as the end of the articulated bolt 32 that projects under some circumstances, are accommodated in recesses 84 of the cap 76. The cap 76 has a bearing surface 78 on the edge of the recesses 84 and this bearing surface is adjacent to the outer side of the coordinating side wall 30 of the suspension box 28. The lateral passages 34 are protected from moisture and dirt as a result.

The bearing element 68 has several longitudinal slots 70 distributed on the circumference, which extend radially from a bearing bore hole 74 for the pin 22 up to the outer circumference. As a result, the outside diameter of the locking hooks 72 can be pressed together to the inside diameter of the passages 34. As soon as the locking hooks 72 pass through the passages 34, the bearing element 68 expands again, thereby fixing the adapter 66 on the suspension box between the bearing surface 78 and the locking hooks 72. In addition, the cap 76 has clips 80 on its edge facing the suspension box 28, with which the adapter 66 engages on the edges of the coordinating side wall 30 of the suspension box 28 during assembly, thereby securing the bearing element 68 against twisting. Provided on the side of the cap 76 facing away from the bearing element 68 is a bearing surface 82 for the bent end 14 of the bridge 12. Because of the smooth surface, it is simple to assemble the wiper blade 24 on the wiper arm 10. In addition, the bent end 14 can be designed with a low amount of play vis-à-vis the bearing surface 82. Because of the low tolerances, a good guide is yielded between the wiper arm 10 and the wiper blade 24.

Finally, the cap 76 that is closed towards the outside improves the optical impression of the articulated connection.

The invention claimed is:

1. Adapter (66) for the articulated connection of a wiper blade (24) to a wiper arm (10) using a sidelock system, wherein the adapter (66) has an essentially cylindrical longitudinally slotted bearing element (68), which can be inserted into passages (34) in side walls (30) of a suspension box (28) of the wiper blade (24) and can be fixed on a first end on the edge of a passage (34) in one side wall (30) by means of locking hooks (50), while a second end of the bearing element (68) is connected with a bearing surface (78), which is adjacent to the outer side of an opposing side wall (30) and is secured against twisting by at least one clip (80), characterized in that the clip (80), has a locking nose (60), which points toward the bearing element (68) and locks on an edge of the opposing side wall (30) of the suspension box (28) during assembly, characterized in that the second end is formed on a cap (76), whose bearing surface (78) is adjacent to the coordinating side wall (30) in an assembled state and which features at least one clip (80), and characterized in that the cap

(76) has recesses (84) on the side of the bearing element (68) and in an assembled state it externally covers the passages (34) and an articulated bolt (32).

2. Adapter (66), according to claim 1, characterized in that the cap (76) has a bearing surface (82) on its outer side for a bent end (14) of a bridge (12) of the wiper arm (10).

3. Adapter (66) for the articulated connection of a wiper blade (24) to a wiper arm (10) using a sidelock system, wherein the adapter (66) has an essentially cylindrical longitudinally slotted bearing element (68), which can be inserted into passages (34) in side walls (30) of a suspension box (28) of the wiper blade (24) and can be fixed on a first end on the edge of a passage (34) in one side wall (30) by means of locking hooks (50), while a second end of the bearing element (68) is connected with a bearing surface (78), which is adjacent to the outer side of an opposing side wall (30) and is secured against twisting by at least one clip (80), characterized in that the clip (80), has a locking nose (60), which points toward the bearing element (68) and locks on an edge of the opposing side wall (30) of the suspension box (28) during assembly, characterized in that the second end is formed on a cap (76), whose bearing surface (78) is adjacent to the coordinating side wall (30) in an assembled state and which features at least one clip (80), characterized in that the cap (76) has a bearing surface (82) on its outer side for a bent end (14) of a bridge (12) of the wiper arm (10), and characterized in that the cap (76) has recesses (84) on the side of the bearing element (68) and in an assembled state it externally covers the passages (34) and an articulated bolt (32).

\* \* \* \* \*